(12) United States Patent
Hodge

(10) Patent No.: US 10,047,806 B2
(45) Date of Patent: Aug. 14, 2018

(54) CLUTCH CARRIER ASSEMBLY HAVING RETENTION LIP AND FLUID DAM

(71) Applicant: Schaeffler Technologies AG & Co. KG, Herzogenaurach (DE)

(72) Inventor: Michael Hodge, Creston, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 157 days.

(21) Appl. No.: 15/096,892

(22) Filed: Apr. 12, 2016

(65) Prior Publication Data

US 2017/0292574 A1    Oct. 12, 2017

(51) Int. Cl.
| F16D 41/00 | (2006.01) |
| F16D 41/067 | (2006.01) |
| F16D 41/07 | (2006.01) |

(52) U.S. Cl.
CPC .......... *F16D 41/00* (2013.01); *F16D 41/067* (2013.01); *F16D 41/07* (2013.01); *F16D 2300/0214* (2013.01); *F16D 2300/06* (2013.01)

(58) Field of Classification Search
CPC .......... F16D 47/02; F16D 7/027; F16D 41/00; F16D 41/067; F16D 41/07; F16D 13/644; F16D 13/646; F16D 13/686; F16D 2300/0214; F16D 2300/06
See application file for complete search history.

(56) References Cited

U.S. PATENT DOCUMENTS

| 5,267,807 | A | * | 12/1993 | Biedermann ....... F16D 25/0638 192/48.614 |
| 9,145,927 | B2 | * | 9/2015 | Luipold .................. F16D 13/58 |
| 9,416,825 | B2 | * | 8/2016 | Lee ....................... F16D 43/211 |
| 2008/0312028 | A1 | * | 12/2008 | Haupt ...................... F16B 4/004 475/346 |
| 2009/0114500 | A1 | | 5/2009 | Kato et al. |
| 2009/0211683 | A1 | | 8/2009 | Takahashi |
| 2014/0246286 | A1 | | 9/2014 | Luipold et al. |
| 2015/0122609 | A1 | | 5/2015 | George et al. |
| 2016/0040720 | A1 | | 2/2016 | Ohr et al. |

FOREIGN PATENT DOCUMENTS

| DE | 3916853 A1 * | 5/1990 | .......... F16D 13/644 |
| DE | 102007028258 A1 * | 12/2008 | ............ F16D 1/072 |
| KR | 1020120123166 A | 11/2012 | |

OTHER PUBLICATIONS

International Search Report and Opinion for PCT/US2017/024460; 12 pgs; dated Jun. 29, 2017 by Korean Intellectual Property Office.

* cited by examiner

*Primary Examiner* — Stacy A Fluhart
(74) *Attorney, Agent, or Firm* — Lekeisha M. Suggs

(57) ABSTRACT

A clutch carrier assembly for a transmission comprising: an axis of rotation, a clutch carrier outer ring concentric about the axis of rotation and having: an outer surface including undulating peaks; and, an inner surface including an axially extending stiffening rib portion; and, an outer race having a radially outward protrusion including a notch arranged for receiving and retaining the axially extending stiffening rib portion.

9 Claims, 3 Drawing Sheets

CLUTCH CARRIER ASSEMBLY HAVING RETENTION LIP AND FLUID DAM

FIELD

The present disclosure relates generally to a one way clutch carrier assembly and is more particularly related to a clutch carrier assembly having features for retention, ease of assembly, and directing oil flow to a clutch pack.

BACKGROUND

U.S. Pat. No. 9,145,927, hereby incorporated by reference herein, describes a one-way clutch carrier assembly with a bearing.

BRIEF SUMMARY

Example aspects broadly comprise a clutch carrier assembly for a transmission comprising: an axis of rotation; a clutch carrier outer ring concentric about the axis of rotation and having: an outer surface including undulating peaks; and, an inner surface including an axially extending stiffening rib portion; and, an outer race having a radially outward protrusion including a notch arranged for receiving and retaining the axially extending stiffening rib portion.

Other example aspects broadly comprise a clutch carrier assembly for a transmission comprising: a clutch carrier including an undulating outer ring having: a plurality of peaks each having at least one aperture arranged for fluid flow therethrough and a fluid dam portion including a ramp surface; a plurality of channels disposed between the plurality of peaks; and an axially extending stiffening rib portion having an end extending in a first axial direction away from the fluid dam portion; and an outer race including a radially outward protrusion having: a first circumferential surface; a notch extending from the first circumferential surface, the notch arranged for receiving and retaining the end of the axially extending stiffening rib portion; and, a radial wall portion having: a first radial surface for directing fluid flow in a second axial direction opposite the first axial direction; a second circumferential surface, radially outward and parallel relative to the first circumferential surface, extending to the notch and, an edge connecting the first radial surface and the second circumferential surface.

Other example aspects broadly comprise a clutch carrier assembly for a transmission comprising: an axis of rotation; a clutch carrier arranged for driving engagement with a plurality of clutch plates and having: a rib portion including: a first end; and, first inner and outer circumferential surfaces, parallel to the axis of rotation and each other, and each connected to the first end; and, a fluid dam portion, radially outward relative to the rib portion, and including: a ramp portion, an undulating top surface, and, a plurality of apertures arranged for fluid flow to exit through the undulating top surface; an outer race having: a first radial surface; second inner and outer circumferential surfaces; a protrusion, radially outward relative to the second outer circumferential surface, and including a radial wall portion having: a second radial surface at a first distance relative to the first radial surface; a notch for receiving the first end, and; third inner and outer circumferential surfaces each connected to the notch. a hub including an outer spline and having a radial wall fixedly connected to and disposed axially between the clutch carrier and the outer race; an inner race arranged for driving engagement with a transmission shaft; and, a one-way clutch disposed radially between the outer race and the inner race.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

In an example aspect, a protrusion is added to an outer ring for a one way clutch assembly to retain the assembly on the front support during a transmission build as is known in the art. The protrusion, or 'retention lip', also serves to solve the problem of deflection of the stamped steel carrier at high RPM events leading to subsequently falling off. The protrusion overlaps a stiffening rib and a fluid dam portion on the carrier. The protrusion also has a surface for the clutch plates to stop against once assembled. A fluid dam to direct the transmission oil to the clutch pack is also disclosed.

Figure 1:
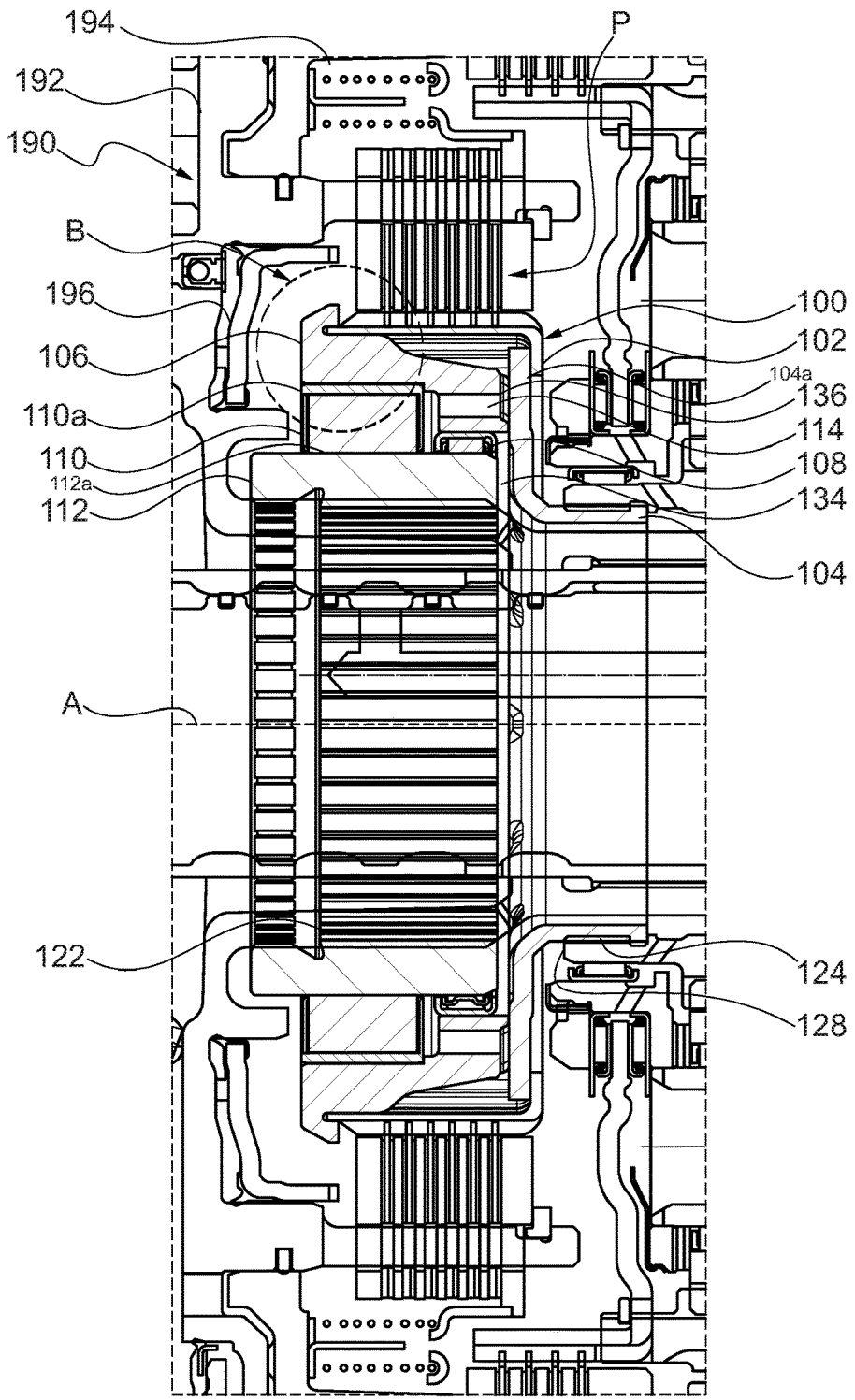
FIG. 1 illustrates a cross-sectional view of a clutch carrier assembly according to an example aspect.
Figure 2:
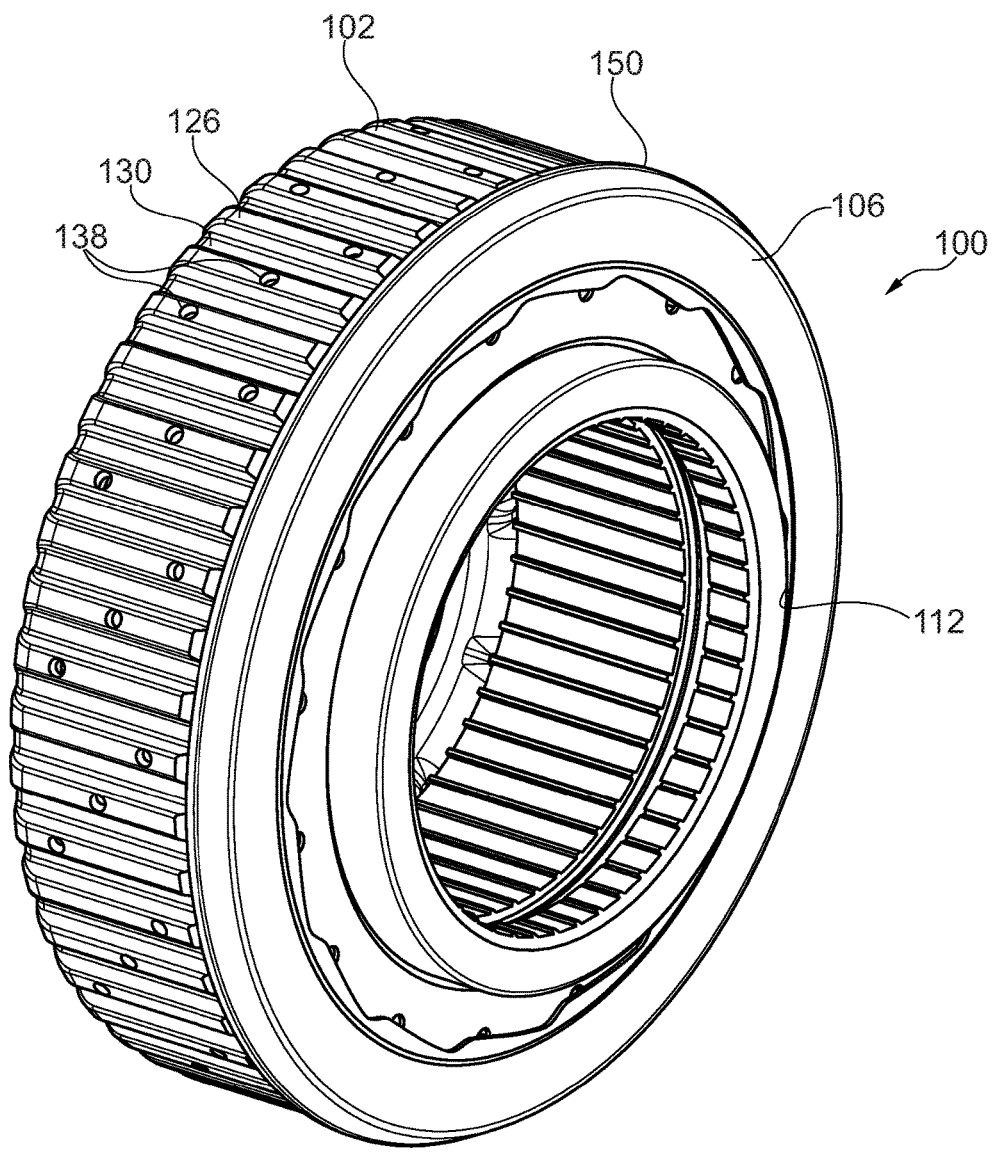
FIG. 2 illustrates a perspective view of a clutch carrier assembly according to an example aspect.
Figure 3:
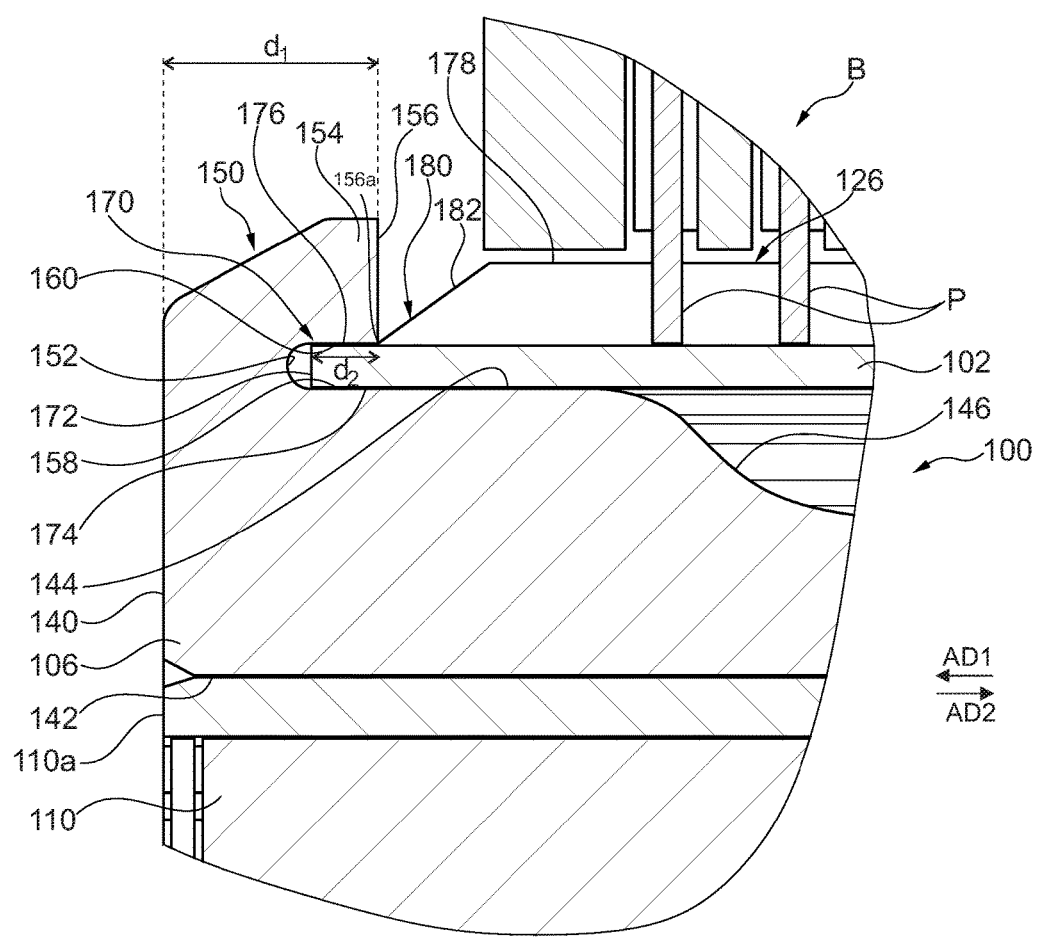
FIG. 3 illustrates a detailed cross-sectional view of area B as shown in FIG. 1 according to an example aspect.

The following description is made with reference to FIGS. 1-3. Assembly 100 includes axis of rotation A, carrier 102, hub 104, outer race 106, bearing 108, one-way clutch assembly 110, and inner race 112. In an example embodiment, bearing 108 is a ball bearing capable of carrying radial and axial loads. Carrier 102, hub 104, and outer race 106 are fixedly attached by rivets 114. Rivets 114 are countersunk within race 106 for proper positioning of one-way clutch assembly 110. Assembly 110 is press-fitted into outer race 106. Inner race 112 includes inner spline 122 for driving engagement with the shaft. Hub 104 includes radial wall 104a and outer spline 124 for driving engagement with a transmission component such as gear 128, for example.

Carrier 102 includes outwardly facing circumferential undulations or peaks 126 alternatingly with channels 130 for driving engagement with a plurality of clutch plates P. In an example embodiment, outer race 106 and inner race 112 are produced using a powdered metal process. In an example embodiment, inner race 112 is produced using a powdered metal forging process. In an example embodiment, one-way clutch assembly 110 is a cartridge-style roller clutch with rollers, springs, and a ramped outer ring cage. Alternatively, one-way clutch assembly 110 could include rockers as known in the art.

As best seen in FIG. 3 detailing area B of FIG. 1, protrusion 150 of outer race 106 provides radial positioning and retention of rib portion 170 of carrier 102 relative to the transmission shaft (not shown). Referring to FIG. 1, hub 104 includes radially extending slots or grooves 134 for lubrication of bearing 108 and one-way clutch 110, referred also to as one-way clutch assembly 110. That is, grooves 134 allow a fluid flow between inner race 112, bearing 108, and hub 104. Grooves 134 may be formed by coining in a stamping press, for example. Race 106 includes radial grooves 136, connected to grooves 134, and carrier 102 includes slots 138 (shown in FIG. 2), for providing lubrication and cooling flow to the clutch plates P.

Clutch carrier 102 is arranged for driving engagement with a plurality of clutch plates P. Carrier 102 comprises rib portion 170 and fluid dam portion 180, as well as a plurality of undulations 126. A plurality of rib portions 170 are located alternatingly and circumferentially offset relative to a plurality of fluid dam portions 180. Rib portion 170 includes circumferential surfaces 174 and 176 connected by end 172. Circumferential surface 174 is also referred here interchangeably herein as inner surface 172 of carrier 102. Fluid dam portion 180, which is radially outward relative to rib portion 170, includes ramp surface 182. Undulations 126 include circumferential surfaces 178 having slots or apertures 138 to enable fluid flow therethrough. Circumferential surfaces 178 are offset circumferentially relative to circumferential surfaces 176. Slots 138 may be offset axially as well as circumferentially.

Outer race 106 includes radial surface 140 and circumferential surfaces 142 and 144. Outer race 106 further includes protrusion 150 radially outward relative to circumferential surface 144. Protrusion 150 includes notch 152 having circumferential surfaces 158 and 160 and radial wall portion 154 having radial surface 156 facing plates P, and circumferential surfaces 158 and 160. In an example aspect, surface 158 is an extension of surface 144. In an example aspect notch 152 is arranged for receiving rib portion 170 of carrier 102. In an example aspect, end 172 is disposed radially between surfaces 158 and 160. During operation, carrier 102 cannot expand due to centrifugal forces and is restricted form radial movement due to the retention of rib portion 170 by outer race 106. In an example aspect, end 172 is radially retained by notch 152 and radial wall portion 154. In an example aspect, radial wall portion 154 is also arranged for constricting fluid flow axially, in other words, fluid flow is prevented from leaving at end 172. Instead, fluid flow is directed in axial direction AD2 to exit only via slots 138 leading to the clutch pack having clutch plates P.

In an example aspect, clutch carrier assembly 100 for a transmission comprises axis of rotation A and clutch carrier outer ring 102 concentric about axis of rotation A. Outer ring 102 has outer surface 178 including undulating peaks 126 and inner surface 174 including axially extending stiffening rib portion 170. Clutch carrier assembly 100 further includes outer race 106 having radially outward protrusion 150 including notch 152 arranged for receiving and retaining axially extending stiffening rib portion 170. Axially extending stiffening rib portion 170 includes first and second circumferential surfaces 158, 160 connected by end 172 or end surface 172 extending in axial direction AD1. In an example aspect, inner surface 174 includes first circumferential surface 158. First circumferential surface 158 is radially inward relative to second circumferential surface 160. First and second circumferential surfaces 158, 160 are parallel to each other and to axis of rotation A. In an example aspect, axially extending stiffening rib portion 170 is circumferentially continuous. In an example aspect, undulating peaks 126 further include fluid dam portion 180 having ramp surface 182. In an example aspect, outer surface 178 further includes channels 130 disposed alternatingly between the undulating peaks 126, wherein channels 130 are arranged for fluid flow. In an example aspect, protrusion includes a radial surface for directing a fluid flow in a second axial direction opposite the first axial direction; and wherein the radial surface is displaced at a first distance in the second axial direction relative to the end surface.

In an example aspect, clutch carrier outer ring 102 is fixed to hub 104. Radial movement of outer race 106 relative to hub 104 is restricted by outer ring 102. This is due to axially extending stiffening rib portion 170 of outer ring 102 being mated within and secured by notch 152 of radially outward protrusion 150 of outer race 106. In an example aspect, radial surface 156 of radially outward protrusion 150 forms edge 156a common with notch 152, the edge extending in the second axial direction a first distance relative to the end. In an example aspect, edge 156a is arranged to meet fluid dam portion 180 to redirect fluid flow back to channels 130. Advantageously, fluid flow is not lost in axial direction AD1 due to radial surface 156 of protrusion 150.

In another example aspect, radially outward protrusion 150 is arranged for restricting axial movement of clutch carrier assembly 100. In other words, notch 152 successfully restricts movement and clutch carrier assembly 100 is secured by radially outward protrusion 150 to a front support assembly 190 during assembly of a transmission. Front support assembly 190 includes front support casting 192, coil spring pact 194, piston 196, and clutch pack P.

In an example aspect, clutch carrier assembly 100 for a transmission comprises clutch carrier including undulating outer ring 102 having a plurality of peaks 126 each having at least one aperture 138 arranged for fluid flow therethrough and fluid dam portion 180 including ramp surface 182. Plurality of channels 130 is disposed between plurality of peaks 126. Channels 130 and peaks 126 alternate circumferentially about outer ring 102. Axially extending stiffening rib portion 170 includes end 172 extending in axial direction AD1 away from fluid dam portion 180. Clutch carrier assembly 100 further includes outer race 106 having radially outward protrusion 150. Protrusion 150 includes circumferential surface 174 and notch 152 extending from circumferential surface 174, wherein notch 152 is arranged for receiving and retaining end 172 of axially extending stiffening rib portion 170. In an example aspect, protrusion 150 further includes radial wall portion 154 having radial surface 156 for directing fluid flow in axial direction AD2 opposite axial direction AD1. Protrusion 150 further includes circumferential surface 176, radially outward and parallel relative to circumferential surface 174, extending to notch 152 and edge 156a connecting radial surface 156 and circumferential surface 176. In an example aspect, clutch carrier assembly 100 further includes hub 104, wherein hub 104 includes radial wall 104a disposed axially between the clutch carrier and the outer race. In an example aspect hub 104, clutch carrier 102, and outer race 106 are fixed together by riveting via rivet 114, for example. In an example aspect, clutch carrier assembly 100 further comprises one-way clutch assembly 110 installed within or disposed between outer race 106 and inner race 112. Inner race 112 includes outer circumferential surface 112a installed within one-way clutch assembly 110. In an example aspect, outer race 106 further comprises circumferential surface 142 radially inward relative to circumferential surface 144. Bearing 108 is installed within circumferential surface 142 and is axially aligned with inner race 112.

In an example aspect, clutch carrier assembly 100 for a transmission comprises axis of rotation A and clutch carrier 102 arranged for driving engagement with a plurality of clutch plates P. Clutch carrier 102 has rib portion 170 having end 172 and inner and outer circumferential surfaces 174 and 176. Circumferential surfaces 174 and 176 are parallel to axis of rotation A and to each other, and each is connected to end 172. Clutch carrier 102 also has fluid dam portion 180, radially outward relative to rib portion 170, and includes ramp portion 182, undulating top surface 126, and plurality of apertures 138 arranged for fluid flow to exit through undulating top surface 126. Clutch carrier assembly 100 includes outer race 106 having radial surface 140, inner and outer circumferential surfaces 142 and 144, and protrusion 150. Protrusion 150 is radially outward relative to outer circumferential surface 144 and includes radial wall portion 154 having radial surface 156 at distance d1 relative to radial surface 140. Protrusion 150 further includes notch 152 for receiving end 172. Protrusion 150 overlaps stiffening rib 170 at distance d2 as measured from radial surface 156 to end 172. Inner and outer circumferential surfaces 158 and 160 each connected to notch 152. In an example aspect, circumferential surface 158 is an extension of circumferential surface 144. Hub 104 includes outer spline 124 and radial wall 104a fixedly connected to and disposed axially between clutch carrier 102 and outer race 106. Inner race 112 is arranged for driving engagement with a transmission shaft. One-way clutch 110 is disposed radially between outer race 106 and inner race 112. In an example aspect, clutch carrier assembly 100 includes radial groove 134 disposed axially between outer race 106 and hub 104. In an example aspect, clutch carrier assembly 100 includes at least one rivet 114, wherein hub 104, clutch carrier 102, and outer race 106 are fixed together by riveting. In an example aspect, fluid flow is arranged via a flow pathway including radial groove 134, rivet 114, and apertures 138, wherein the flow pathway is arranged for fluid flow to clutch plates P, and wherein fluid flow is restricted by radial surface 156.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A clutch carrier assembly for a transmission comprising:
    a clutch carrier including an undulating outer ring having:
        a plurality of peaks each having at least one aperture arranged for fluid flow therethrough and a fluid dam portion including a ramp surface;
        a plurality of channels disposed between the plurality of peaks; and
        an axially extending stiffening rib portion having an end extending in a first axial direction away from the fluid dam portion; and
    an outer race of a clutch including a radially outward protrusion having:
        a first circumferential surface;
        a notch extending from the first circumferential surface, the notch arranged for receiving and retaining the end of the axially extending stiffening rib portion; and,
        a radial wall portion having:
            a first radial surface for directing fluid flow in a second axial direction opposite the first axial direction;
            a second circumferential surface, radially outward and parallel relative to the first circumferential surface, extending to the notch and,
            an edge connecting the first radial surface and the second circumferential surface.

2. The clutch carrier assembly of claim 1 further including a hub, wherein the hub includes a radial wall disposed axially between the clutch carrier and the outer race.

3. The clutch carrier assembly of claim 2 wherein the hub, the clutch carrier and the outer race are fixed together by riveting.

4. The clutch carrier assembly of claim 3 further comprising a one-way clutch assembly installed within the outer race and an inner race including an outer circumferential surface installed within the one-way clutch assembly.

5. The clutch carrier assembly of claim 4, the outer race further comprising a third circumferential surface radially inward relative to the first circumferential surface and a bearing installed within the third circumferential surface and axially aligned with the inner race.

6. A clutch carrier assembly for a transmission comprising:
    an axis of rotation;
    a clutch carrier arranged for driving engagement with a plurality of clutch plates and having:
        a rib portion including:
            a first end; and,
            first inner and outer circumferential surfaces, parallel to the axis of rotation and each other, and each connected to the first end; and,
        a fluid dam portion, radially outward relative to the rib portion, and including:
            a ramp portion,
            an undulating top surface, and,
            a plurality of apertures arranged for fluid flow to exit through the undulating top surface;
    an outer race of a one-way clutch having:
        a first radial surface;
        second inner and outer circumferential surfaces;
        a protrusion, radially outward relative to the second outer circumferential surface, and including a radial wall portion having:
            a second radial surface at a first distance relative to the first radial surface;
            a notch for receiving the first end, and;
            third inner and outer circumferential surfaces each connected to the notch;
    a hub including an outer spline and having a radial wall fixedly connected to and disposed axially between the clutch carrier and the outer race;
    an inner race arranged for driving engagement with a transmission shaft; and,
    wherein the one-way clutch is disposed radially between the outer race and the inner race.

7. The clutch carrier assembly of claim 6 wherein the outer race includes a radial groove disposed axially between the outer race and the hub.

8. The clutch carrier assembly of claim 7 further comprising at least one rivet, wherein the hub, the clutch carrier, and the outer race are fixed together by riveting.

9. The clutch carrier assembly of claim 8 further comprising a flow pathway including the radial groove, the at least one rivet, and the plurality of apertures, wherein the flow pathway is arranged for fluid flow to the clutch plates, and wherein fluid flow is restricted by the second radial surface.

\* \* \* \* \*